United States Patent Office 3,409,471
Patented Nov. 5, 1968

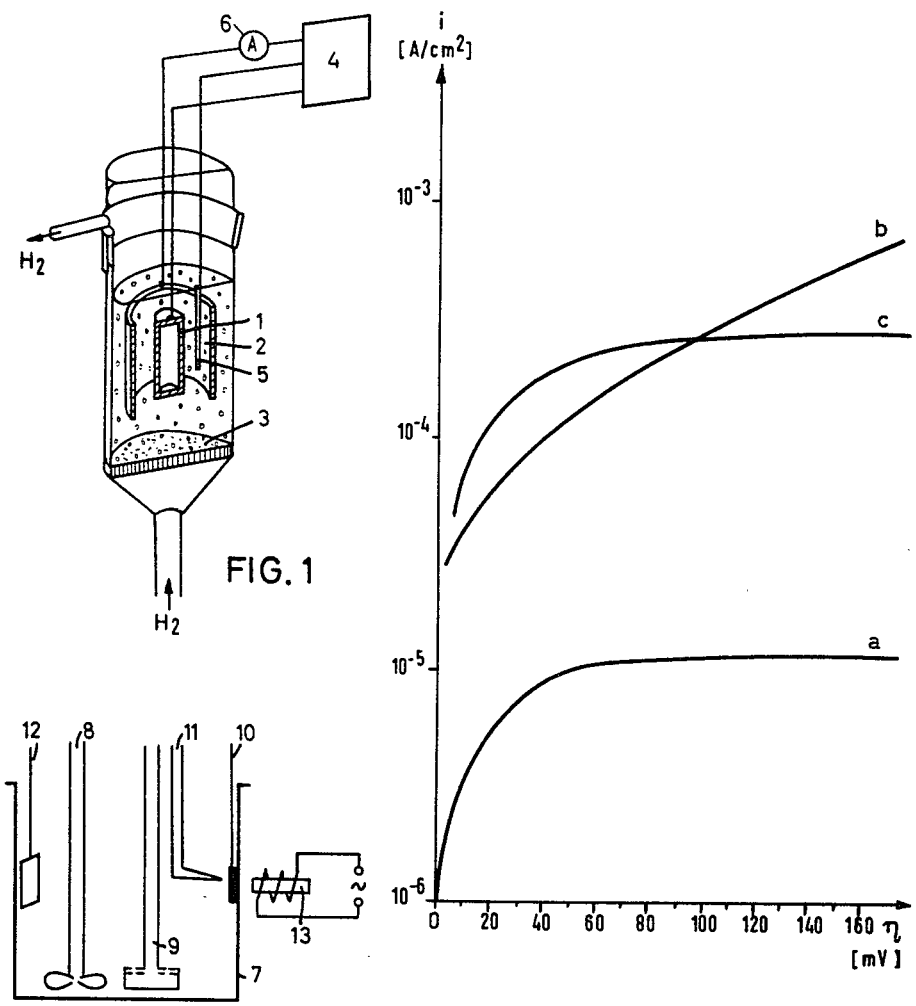

3,409,471
METHOD OF PRODUCING ELECTRICAL ENERGY USING MAGNETIC FIELD
Ferdinand V. Sturm, Erlangen, and Gerhard Richter, Forchheim, Germany, assignors to Siemens Aktiengesellschaft, Munich, Germany
Filed June 18, 1964, Ser. No. 376,276
Claims priority, application Germany, June 19, 1963, S 85,717
7 Claims. (Cl. 136—86)

ABSTRACT OF THE DISCLOSURE

Method of producing electrical energy in an electrochemical cell having an electrically conductive electrode support therein includes the steps which comprise depositing loose ferromagnetic catalyst material on the support, subjecting the support and the material to magnetic force for thereby contacting the material electrically and mechanically with the support so as to form an electrode, producing electrochemical operation of the electrode, and maintaining the magnetic force contact between the material and the support during the electrochemical operation of the electrode.

---

Our invention relates to catalytic electrodes and operating methods for electrochemical cells, such as cells for performing chemical reactions in the production, conversion or testing of chemical substances, cells for electric storage batteries, or fuel cells for direct conversion of chemical into electrical energy, for example.

For attaining maximal efficiency or output when employing catalytic electrodes in electrochemical cells, care must be taken that a rapid or intensive conversion of the reaction agents per unit area takes place at the electrodes. It is important, therefore, to provide the electrodes with effective catalysts in the best suitable form.

Known for this purpose are gas-diffusion electrodes which have a catalytic action. Thus, for producing active electrodes, the catalyst material is introduced into a porous structure consisting of a more or less inactive material such as carbon for example, or the catalyst material is mixed together with another material and then pressed or sintered to form a solid structure, this being the case for example with Raney-nickel in the so-called DSK electrode. Further known are electrodes which contain the catalyst material loosely poured between electrically conducting screen members.

There are also electrochemical cells in which the catalyst is not firmly joined with the electrode but is suspended in a liquid medium which is stirred during operation. The stirring motion, however, can produce only an occasional, very short and non-controllable contact engagement of the catalyst particles with the electrode, thus resulting in poor electrochemical utilization.

It is an object of our invention to provide an electrochemical electrode and to devise suitable production and operating methods which afford in a particularly simple manner complete utilization of a mass of loose catalyst material.

Another object of our invention is to provide a catalytic electrode for electrochemical cells in conjunction with an operating method that affords an intermittent and accurately timed controllable operation whose intermittent periods of contact engagement between catalyst material and electrode structure proper can be adjusted or varied as may be desired.

Still another object of our invention is to devise a catalytic electrode for electrochemical cells that affords increasing the adherence of the loose catalyst material to the rigid supporting structure of the electrode.

To achieve these objects, and in accordance with one of the features of our invention, we provide the electrode of an electrochemical cell with a supporting structure and a loose ferromagnetic catalyst material which may be ferromagnetic per se or may consist of a finely divided ferromagnetic carrier substance charged with the catalyst material proper. The mechanical and electrical contact between the catalyst material and the electrically conducting supporting structure is produced and maintained by subjecting the ferromagnetic catalyst material to magnetic forces.

By thus providing for magnetic adherence of catalyst material to a magnetized supporting structure, the adherence and contact of the catalyst can be made continuous (steady) or intermittent. In the latter case, the contact engagement is alternately eliminated and reestablished.

When operating with continuous or steady adherence of the catalyst to the supporting structure, the resulting electrode according to the invention corresponds in principle to a steady electrochemically active electrode, such as a screen-type electrode, but can be more easily produced and more effectively employed. With an intermittent or interrupted magnetization according to the invention, the catalyst material becomes effective as a transfer catalyst which operates in a comparable manner as when a stirred medium is employed; however, the invention affords the possibility of controlling the contacting periods at will. In both modes of operation, the adhesion pressure between catalyst material and electrode can be greatly increased, thus reducing the resistance to current transfer.

According to another feature of the invention, a permanent magnet is movably mounted behind the electrode, and in accordance with a modification thereof an electromagnet is mounted behind the electrode and its energizing current can be switched on and off. Both of these alternate features permit selecting and controlling the establishment and elimination of the mechanical catalyst-support contact with respect to frequency and duration.

The regeneration of the spent transfer catalyst can be effected within the electrochemical cell or in a separate regenerating vessel outside the cell. The regeneration comprises charging the catalyst material with the electro-active substance; for example nickel can be charged with $H_{ads.}$, silver with $O_{ads.}$ or platinum with adsorbable organic compounds. When contacting the electrode, electron exchange takes place between the catalyst particles and the electrode, the electro-active substance being simultaneously reduced or oxidized and consequently electrically deactivated when an electric current is passed through the support generally releasing the substance so that it goes into solution. The catalyst particles are then available for recharging with the electrically active substance.

Primarily all substances that are ferromagnetic by nature such as iron, iron (II, III)-oxide, nickel on aluminum oxide, nickel on silicon dioxide, Raney nickel, and cobalt are suitable as catalyst substances for the purpose of the invention. Also suitable are catalysts that can be charged or coated upon the ferromagnetic carrier substance, such as silver or platinum on nickel or iron.

Other features which are considered as characteristic for the invention are set forth in the appended claims.

Although the invention has been illustrated and described as catalytic electrode and operating method for electrochemical cells, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description when read in connection with the accompanying drawings, in which:

FIG. 1 shows schematically and in perspective a sectional view of an electrochemical cell for recording current-voltage curves, serving to test electrodes according to the invention.

FIG. 2 is an explanatory graph showing current-voltage curves taken both with an electrode according to the invention and with conventional electrodes, for the purpose of comparison.

FIG. 3 shows schematically an experimental cell.

Figure 4:
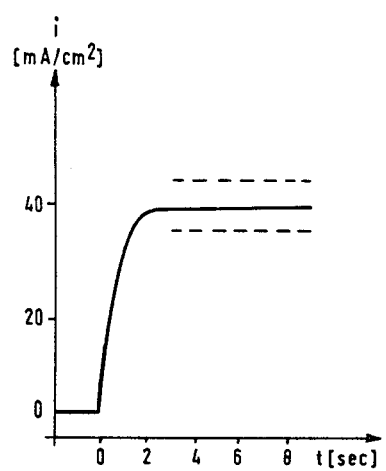
FIG. 4 is an explanatory graph showing the current measured in the cell according to FIG. 3 with respect to time.

In the measuring cell according to FIG. 1, there is shown a working electrode consisting of a small cylindrical rod-shaped permanent magnet 1 of about 10 mm. length and 5 mm. diameter which is nickel-coated for protection against corrosion and which magnetically holds on its surface a pulverulent catalyst consisting of Raney nickel. The counter electrode 2 consists of a cylindrical platinum sheet. Both electrodes are immersed in electrolyte liquid. By blowing hydrogen through a layer 3 of frit at the bottom of the cell, the electrodes are rinsed with hydrogen.

The cell is used for taking a current-voltage curve. For this purpose the working electrode 1 is maintained by means of a potentiostat 4 at a constant positive potential relative to the reference in a $Pt/H_2$ electrode 5, and the current flowing between the working electrode 1 and the reference electrode 5, is measured with the aid of an ammeter 6. The anodic current at the working electrode is indicative of the rate of the $H_2$-oxidation.

The cell shown in FIG. 1 was used for determining the current-voltage curves relating to hydrogen-oxidation in 6 n KOH, these curves being shown in FIG. 2. The over-voltage $\eta$ is indicated on the abscissa in millivolts. The ordinate indicates current density $j$ in ma./cm.$^2$. Curve $a$ relates to the use of a smooth nickel sheet as working electrode. Curve $b$ relates to a catalytic electrode according to the invention on which a two-phase boundary has formed. By applying the catalyst to the nickel sheet with the aid of magnetic forces, the current at an over-voltage of 50 mv. increases by a factor of 10. For comparison, curve $c$ shows the current-voltage conditions for a highly active platinized platinum electrode.

The cell schematically shown in FIG. 3 comprises a vessel 7 containing a suspension of 5 g. activated Raney nickel of a grain size $<6\mu$ in a solution of 150 milliliter 6 n KOH. The electrolyte is kept agitated by means of a stirrer 8 to prevent settling of the Raney nickel. The suspension is continuously supplied with hydrogen through a supply pipe 9 having a layer of frit across its supply opening so that the suspension is always saturated with hydrogen during operation of the cell. For a potential between measuring electrode 10 and reference electrode 11, that is more positive than the hydrogen potential in th solution, there will first flow a small amount of current between the counter electrode 12 and the measuring electrode. After the electro-magnet 13 is switched on at the time $t=0$, the current greatly increases, this being apparent from the curve shown in FIG. 4 in which the time $t$ in seconds is indicated along the abscissa and the current density $j$ in ma./cm.$^2$ along the ordinate. The magnet 13 is preferably energized with alternating current or interrupted direct current so that the attracted Raney granules will not continuously adhere to the electrode but will become periodically interchanged and thereby given an opportunity to replenish the consumed hydrogen in the solution. The current varies between the values indicated by the broken lines in FIG. 4.

Figure 5:
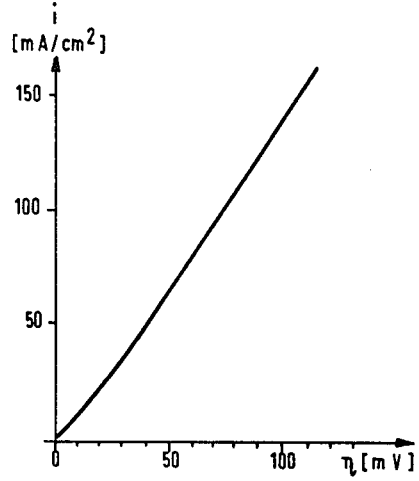
FIG. 5 is another explanatory graph relating to the same cell and showing the dependence of the current upon the over-voltage.

FIG. 5 indicates the dependence of the current density $j$ upon the over-voltage $\eta$ during operating periods of the magnet 13. A rotating permanent magnet can be substituted for the electromagnet.

Catalytic electrodes according to the invention are suitable for a great variety of applications. When having a perforated plate, provided with Raney nickel or cobalt powder and traversed by hydrogen or oxygen, such an electrode according to the invention within an alkaline electrolyte is applicable as an $H_2$ electrode or $O_2$ electrode for fuel cells. Platinized nickel powder may also be used in lieu of Raney nickel or cobalt powder. If the electrolyte contains dissolved fuel, for example ethanol, then the electrode according to the invention is also applicable as an alcohol electrode in which case the catalyst material preferably consists of nickel powder deposited upon $Al_2O_3$ (sintered alumina). Electrodes according to the invention are applicable as amino acid electrodes, when amino acid as a fuel is dissolved in acidic electrolytes. In the latter case, platinized nickel powder is employed as catalyst. When employing an electrode according to the invention in an accumulator (electric storage battery) the Raney nickel powder located on a magnetic plate is charged and discharged alternately with hydrogen in accordance with the charging and discharging cycle of such a storage battery.

Figure 6A:
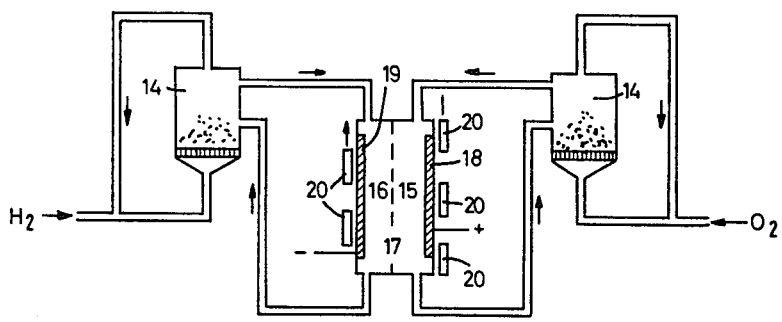
FIG. 6a shows schematically an individual electrochemical cell operating in accordance with the invention.

According to the embodiment illustrated in FIG. 6a, the charging of the transfer catalyst material with electroactive substance can also be effected outside of the electrode.

The apparatus shown in FIG. 6a is provided with two regenerating vessels 14 and 14'. The catalyst suspension, for example silver on nickel in vessel 14' or Raney nickel in vessel 14 is treated in an alkaline electrolyte such as 5 n KOH with oxygen or air (vessel 14') or with hydrogen (vessel 14). If desired, increased pressure may be applied in these vessels.

The sludge-like suspension is pumped through the cathode chamber 15 or anode chamber 16 of the fuel cell. The cathode chamber is separated from the anode chamber by a separator diaphragm 17 consisting of a porous structure or an ion exchange diaphragm. Corrosion-resistant sheet metal members 18 and 19 are used as electrodes. Magnets 20 are moved along the rear sides of the electrodes. While passing through the cell, the catalyst granules successively enter into contact with the electrode to which they surrender their charges. After passing through the cell, the sludge is returned into the proper regenerating vessel. The counter electrode may consist of a conventional porous hydrogen electrode or may operate on the principle of the magnetized electrode according to the invention, the latter being shown in FIG. 6a. If required, the flow can be adjusted to different speeds in the respective cathode and anode chambers. In the last-mentioned case, the separator member 17 must be relatively dense, so that the use of an exchanger diaphragm is preferable.

Figure 6B:
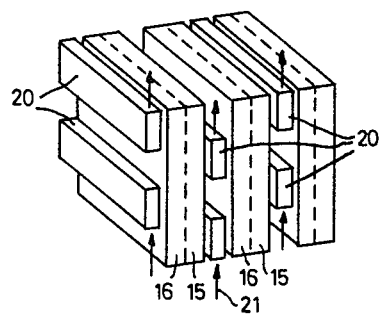
FIG. 6b shows perspectively a portion of the cell arrangement for an electric storage battery.

The arrangement of individual cells in a storage battery is illustrated in FIG. 6b. Metallic contact exists between adjacent electrodes of neighboring cells; the cells are electrically connected in series. The arrows 21 denote the travelling direction of the magnets.

The charging of the catalyst material may also be effected by reaction with a dissolved substance. This possibility can be utilized for oxidation or reduction of organic compounds. The oxidation or reduction intensity of the transfer catalyst can be controlled by means of the electric potential applied to the electrode. This permits an accurate control and programming of oxidation and reduction so that the desired ultimate product can be obtained with an increased yield.

Example 1

Employed as a hydrogen electrode is a catalytic electrode consisting of a platinum sheet immersed in 6 n KOH which contains an amount of cobalt powder as hydrogen charged catalyst material, namely 10 g. Co per 100 ml. electrolyte. The electrolyte is pumped through the cell. By means of an electromagnet energized by alternating current, the catalyst powder is intermittently attracted by the electrode. The cobalt powder is produced from cobalt oxalate by reduction at 300° C. The current density is 210 ma./cm.$^2$ at 25° C. and 150 mv. over-voltage.

Example 2

The arrangement of the hydrogen electrode is the same as in Example 1. A Raney nickel powder having a grain size $<50\mu$ is used as transfer catalyst. The concentration of catalyst material is 10 g./100 ml. electrolyte. At 150 mv. over-voltage, a current density of 190 ma./cm.$^2$ is attained.

Example 3

When using acidic electrolytes, the transfer catalysts employed in Examples 1 and 2 are no longer suitable because of corrosion. However, electrically satisfactory hydrogen electrodes were obtained in the present example by using a ferromagnetic platinum cobalt alloy as transfer catalyst material. The electrolyte employed was 14 m. H$_3$PO$_4$. Also suitable in such an electrolyte is a palladium-iron alloy catalyst containing up to 80% palladium.

Example 4

Nickel-silver alloys serving as ferromagnetic catalyst material were used as a hydrogen electrode for a fuel cell. To provide for the largest feasible catalyst surfaces, the alloy constituents were melted together starting from their respective aluminum alloys. Prior to using the catalyst material, the aluminum contained in the alloy was dissolved and eliminated therefrom with the aid of 6 n KOH, in the manner conventional in the production of Raney metals. The catalyst material produced in this manner from nickel and silver in the ratio of 2:1 by weight, having a grain size $<100\mu$, was suspended in the electrolyte consisting of 5 n KOH, 6.5 g. catalyst being added to 100 ml. electrolyte to obtain a sludge-like suspension. A platinum mesh was used as magnetized electrode with an intermittently operating electromagnet energized at a frequency of 50 c.p.s. Oxygen at 1 atm. pressure was employed as oxidant. At a temperature of 25° C. and an over-voltage of 350 mv., the current density was measured at 12.3 ma./cm.$^2$.

Example 5

The arrangement of the oxygen electrode in a fuel cell is the same as in Example 4. Silvered Raney nickel (silver:nickel=1:2) was employed as catalyst material. The catalyst concentration is 15 g./100 ml. electrolyte. At a polarization of 100 mv., the current density is 24 ma./cm.$^2$, and at 150 mv. the current density is 34 ma./cm.$^2$.

Example 6

A catalyst electrode consisting of a platinum sheet immersed in 6 n KOH containing Raney nickel powder as tranfer catalyst material was used as alcohol electrode. The catalyst had a grain size $<100\mu$ in suspension with a concentration of 10 g. catalyst per 100 ml. electrolyte. The electrolyte flowed along the electrode. Added to the electrolyte as fuel was 2% ethanol. The catalyst powder was contacted with the platinum sheet electrode by means of an electromagnet operating with alternating current. At a temperature of 55° C. and an over-voltage of 100 mv., the current density of the magnetized electrode was 145 ma./cm.$^2$.

Example 7

The same arrangement of an alcohol electrode as in Example 6 was used in this example. The fuel consisted of an addition of 10% ethanol admixed to the electrolyte. At 25° C. and an over-voltage of 130 mv., the current density was measured at 200 ma./cm.$^2$.

Example 8

An alcohol electrode as described in Example 6 was used in this example. 2% methanol was admixed as fuel to the electrolyte. At 43° C. and an over-voltage of 130 mv., the current density was 100 ma./cm.$^2$.

Example 9

In this example there was used an alcohol electrode corresponding, in principle, to that described in Example 6, except that the electrode was magnetized by a permanent magnet. The Raney nickel catalyst, therefore, was continuously in contact with the electrode. The electrolyte was at rest. 2% methanol was admixed to the electrolyte to serve as fuel. Very high current densities were measured for short intervals of time. At 25° C. and an over-voltage of 100 mv., the current density was 30 ma./cm.$^2$.

Example 10

The electrode arrangement was the same as that in Example 9; however, the electrolyte was subjected to stirring to provide for changing of the catalyst particles. The same effect can be obtained by having the electrolyte flow along the weakly magnetized electrode. Continuous current loads with current densities of 50 ma./cm.$^2$. at 25° C. were measured.

The catalytic electrode according to the invention has the advantage of affording a particularly simple manner of production which avoids the relatively complicated production steps involved in the pressing and sintering of porous electrodes. Furthermore, when operating with intermittent magnetization, a larger quantity by far of catalyst material is available than can be effectively accommodated in a stationary electrode for the same area.

While only a fraction of the circulating catalyst reacts on the electrodes at a time, the remainder of the catalyst is available for performing the method steps of diffusion and reaction (such as adsorption, dissociation and dehydration for example) which determine the rate of performance with conventional electrodes. When applying regeneration of the catalyst, the diffusion conditions are more favorable than with a catalyst that is built into the electrode. Slow occurrence of the preceding reactions can be obtained by the selection of a suitable period for the retention of the catalyst in the regenerating vessel. In contrast to the operating methods heretofore known for electrochemical cells, the frequency and duration of the catalyst-electrode contact is controllable and selectable by the kind of magnetization employed. It is furthermore readily possible to replenish or replace the spent or contaminated catalst. The re-processing of the catalyst can be performed without dismantling the cell or the storage battery of which the cell may form part.

We claim:

1. Method of maintaining and operating an electrochemical cell having an electrically conductive electrode support therein, the steps which comprise depositing loose ferromagnetic catalyst material on the support, subjecting the support and the material to magnetic force for thereby contacting the material electrically and mechanically with the support so as to form an electrode, producing electrochemical operation of the electrode by circulating fuel through the cell so that it engages the electrode support, maintaining the magnetic force contact between the material and the support during the electrochemical operation of the electrode, and withdrawing electrical energy from the support.

2. The method according to claim 1, wherein said catalyst material consists of a ferromagnetic carrier substance and catalyzer substance on said carrier substance.

3. The method according ot claim 1, which comprises maintaining the magnetic force contact continuously during electrochemical operation of the electrode.

4. The method according to claim 1 intermittently applying magnetic force to the material for thereby periodically contacting the material electrically and mechanically with the support.

5. The method according to claim 4, which comprises charging the catalyst material with electro-active substance in the intervals between the contacting periods.

6. The method according to claim 1, wherein said catalyst material is selected from the group consisting of iron, iron (II, III) oxide, nickel on aluminum oxide, nickel on silicon dioxide, Raney nickel, silver on nickel, silver on iron and cobalt.

7. Method for maintaining and operating an electrochemical cell having an electrically conducting electrode support therein so as to produce electrical energy, which comprises supplying fuel to an electrolyte in the cell and circulating the fuel bearing electrolyte through the cell so that it is engagment with the electrode support, depositing loose catalyst material charged wtih electro-active substance on the support, applying magnetic force to the support and the material for placing the material in electrical and mechanical contact with the support as the electrolyte is being circulated through the cell during operation of the cell so as to electrically deactivate the substance when the support is electrically energized, and supplying electro-active substance for recharging the catalyst material, and withdrawing electrical energy from the support.

References Cited

UNITED STATES PATENTS

| 2,397,177 | 3/1946 | Wick. | |
| 2,941,956 | 6/1960 | Bergstrom | 252—418 |
| 3,067,276 | 12/1962 | Gruneberg et al. | 136—164 |
| 3,253,956 | 5/1966 | Vielstich et al. | 136—86 |
| 3,266,943 | 8/1966 | Goldner | 136—86 |

FOREIGN PATENTS

| 101,600 | 2/1936 | Australia. |
| 295,507 | 12/1966 | Germany. |

ALLEN B. CURTIS, *Primary Examiner.*